(12) United States Patent
Gladwin et al.

(10) Patent No.: US 7,953,771 B2
(45) Date of Patent: *May 31, 2011

(54) VIRTUALIZED DATA STORAGE VAULTS ON A DISPERSED DATA STORAGE NETWORK

(75) Inventors: S. Christopher Gladwin, Chicago, IL (US); Greg Dhuse, Chicago, IL (US); Vance T. Thornton, Chicago, IL (US); Manish Motwani, Chicago, IL (US); Ilya Volvovski, Chicago, IL (US); Wesley Leggette, Oak Park, IL (US); Jamie Bellanca, Chicago, IL (US); Sarah Toledano, Chicago, IL (US); Jerri Lynn Foster, Forest Park, IL (US); Zachary J. Mark, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,779

(22) Filed: Dec. 8, 2009

(65) Prior Publication Data

US 2010/0179966 A1 Jul. 15, 2010

Related U.S. Application Data

(63) Continuation of application No. 11/973,621, filed on Oct. 9, 2007.

(51) Int. Cl.
*G06F 17/30* (2006.01)

(52) U.S. Cl. .......... 707/812; 707/999.01; 711/170; 711/154; 711/156; 709/226; 709/223; 709/206

(58) Field of Classification Search .......... 707/812, 707/999.01; 709/226, 223, 206; 711/170, 711/154, 156
See application file for complete search history.

(56) References Cited

U.S. PATENT DOCUMENTS

| 7,502,501 | B2 * | 3/2009 | Joshi .............. 382/128 |
| 7,546,427 | B2 * | 6/2009 | Gladwin et al. .............. 711/154 |
| 7,721,157 | B2 * | 5/2010 | Spitz et al. .............. 714/47 |
| 2009/0094251 | A1 * | 4/2009 | Gladwin et al. .............. 707/10 |

* cited by examiner

*Primary Examiner* — Jean M Corrielus
(74) *Attorney, Agent, or Firm* — Garlick Harrison & Markison; Timothy W. Markison

(57) ABSTRACT

A dispersed data storage system includes a plurality of slice servers. In the system, a first set of the slice servers supports a first virtual digital data storage vault and a second set of the slice servers supports a second virtual digital data storage vault. A slice server is in the first and second sets and functions to: receive a request to access a virtual digital data storage vault; determine whether the virtual digital data storage vault is the first or the second virtual digital data storage vault; when the virtual digital data storage vault is the first or the second virtual digital data storage vault, determine whether the request is valid; and when the request is valid, execute the request to generate a response.

11 Claims, 4 Drawing Sheets

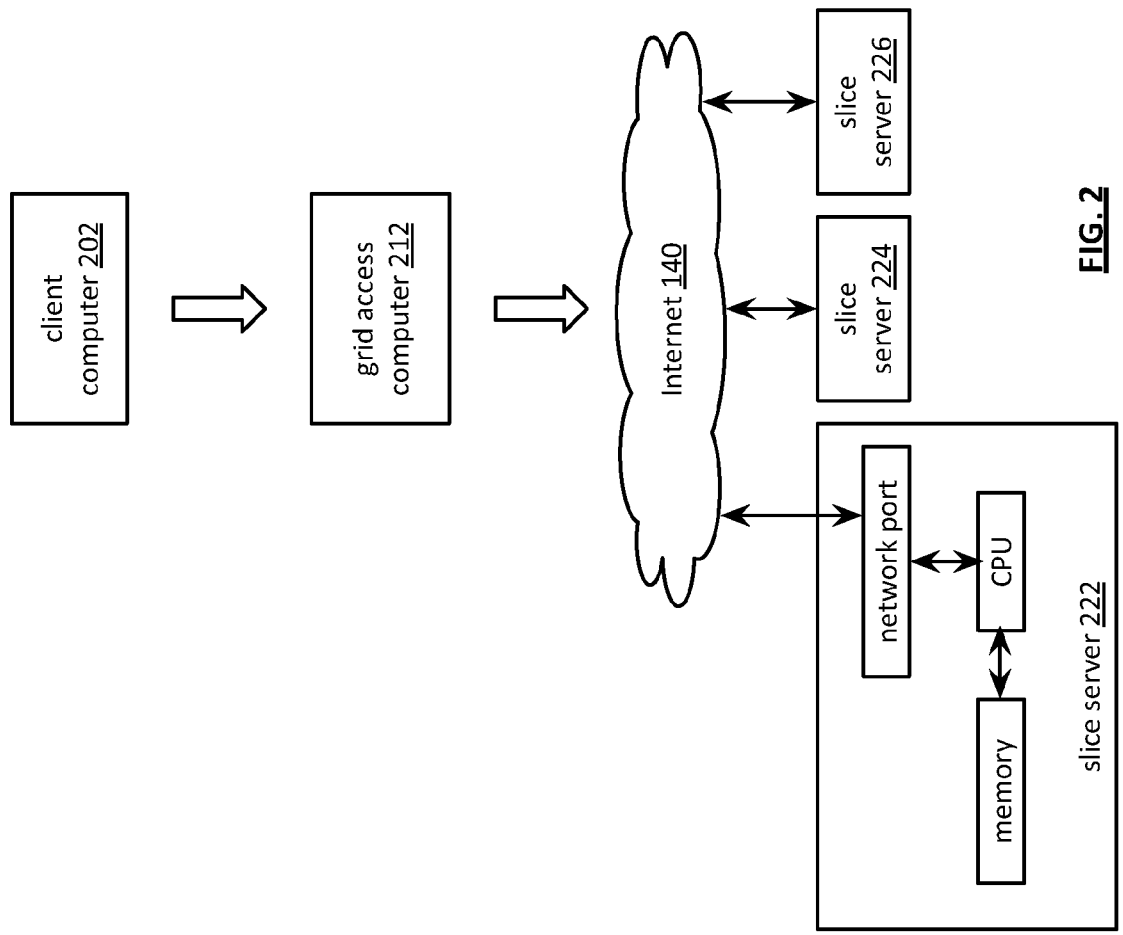
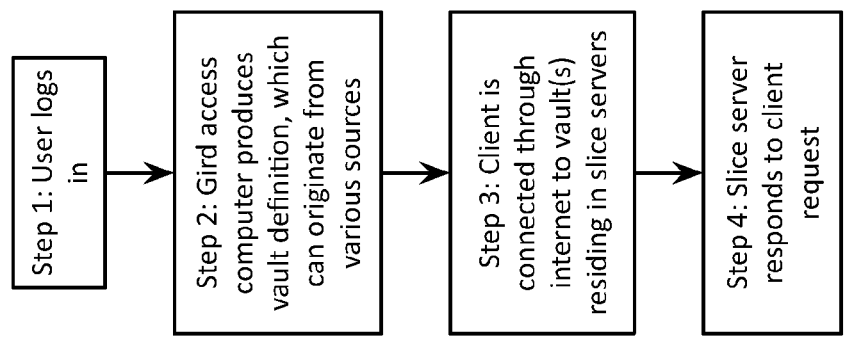
FIG. 2

VIRTUALIZED DATA STORAGE VAULTS ON A DISPERSED DATA STORAGE NETWORK

CROSS-REFERENCE TO RELATED APPLICATIONS

This patent application is claiming priority under 35 USC §120 as a continuing patent application of co-pending patent application entitled VIRTUALIZED DATA STORAGE VAULTS ON A DISPERSED DATA STORAGE NETWORK, having a filing date of Oct. 9, 2007, and a Ser. No. 11/973,621.

FIELD OF THE INVENTION

The present invention relates generally to systems, apparatus, and methods for distributed data storage, and more particularly to systems, apparatus, and methods for distributed data storage using an information dispersal algorithm so that no one location will store an entire copy of stored data, and more particularly still to systems, apparatus, and methods for using a fixed number of slice servers to implement a plurality of dispersed data storage networks.

DESCRIPTION OF THE PRIOR ART

Storing data in digital form is a well-known problem associated with all computer systems, and numerous solutions to this problem are known in the art. The simplest solution involves merely storing digital data in a single location, such as a punch film, hard drive, or FLASH memory device. However, storage of data in a single location is inherently unreliable. The device storing the data can malfunction or be destroyed through natural disasters, such as a flood, or through a malicious act, such as arson. In addition, digital data is generally stored in a usable file, such as a document that can be opened with the appropriate word processing software, or a financial ledger that can be opened with the appropriate spreadsheet software. Storing an entire usable file in a single location is also inherently insecure as a malicious hacker only need compromise that one location to obtain access to the usable file.

To address reliability concerns, digital data is often "backed-up," i.e., an additional copy of the digital data is made and maintained in a separate physical location. For example, a backup tape of all network drives may be made by a small office and maintained at the home of a trusted employee. When a backup of digital data exists, the destruction of either the original device holding the digital data or the backup will not compromise the digital data. However, the existence of the backup exacerbates the security problem, as a malicious hacker can choose between two locations from which to obtain the digital data. Further, the site where the backup is stored may be far less secure than the original location of the digital data, such as in the case when an employee stores the tape in her home.

Another method used to address reliability and performance concerns is the use of a Redundant Array of Independent Drives ("RAID"). RAID refers to a collection of data storage schemes that divide and replicate data among multiple storage units. Different configurations of RAID provide increased performance, improved reliability, or both increased performance and improved reliability. In certain configurations of RAID, when digital data is stored, it is split into multiple units, referred to as "stripes," each of which is stored on a separate drive. Data striping is performed in an algorithmically certain way so that the data can be reconstructed. While certain RAID configurations can improve reliability, RAID does nothing to address security concerns associated with digital data storage.

One method that prior art solutions have addressed security concerns is through the use of encryption. Encrypted data is mathematically coded so that only users with access to a certain key can decrypt and use the data. Common forms of encryption include DES, AES, RSA, and others. While modern encryption methods are difficult to break, numerous instances of successful attacks are known, some of which have resulted in valuable data being compromised.

In 1979, two researchers independently developed a method for splitting data among multiple recipients called "secret sharing." One of the characteristics of secret sharing is that a piece of data may be split among n recipients, but cannot be known unless at least t recipients share their data, where $n \geq t$. For example, a trivial form of secret sharing can be implemented by assigning a single random byte to every recipient but one, who would receive the actual data byte after it had been bitwise exclusive orred with the random bytes. In other words, for a group of four recipients, three of the recipients would be given random bytes, and the fourth would be given a byte calculated by the following formula:

$$s' = s \oplus r_a \oplus r_b \oplus r_c,$$

where s is the original source data, $r_a$, $r_b$, and $r_c$ are random bytes given to three of the four recipients, and s' is the encoded byte given to the fourth recipient. The original byte s can be recovered by bitwise exclusive-orring all four bytes together.

The problem of reconstructing data stored on a digital medium that is subject to damage has also been addressed in the prior art. In particular, Reed-Solomon and Cauchy Reed-Solomon coding are two well-known methods of dividing encoded information into multiple slices so that the original information can be reassembled even if all of the slices are not available. Reed-Solomon coding, Cauchy Reed-Solomon coding, and other data coding techniques are described in "Erasure Codes for Storage Applications," by Dr. James S. Plank, which is hereby incorporated by reference.

Schemes for implementing dispersed data storage networks ("DDSN"), which are also known as dispersed data storage grids, are also known in the art. In particular, U.S. Pat. No. 5,485,474, issued to Michael O. Rabin, describes a system for splitting a segment of digital information into n data slices, which are stored in separate devices. When the data segment must be retrieved, only m of the original data slices are required to reconstruct the data segment, where n>m.

Prior art DDSN systems are only viable for extremely specialized applications, as implementing an effective DDSN requires that a user setup a network of slice servers in multiple physically disparate locations. Existing directory service software will not effectively manage access to a DDSN, particularly as a DDSN does not have physical resources in the sense of a disk drive or directory, but rather is a type of virtual drive, where information is spread across numerous slice servers. Therefore, software for managing access to a DDSN would make DDSN technology accessible to a wider variety of applications.

In addition, the management and administration of a DDSN presents other problems that are not associated with prior art systems. For example, different users of a DDSN may want to store their data in different ways, i.e., one user may want all of their data compressed to save on storage space, while another user may not want to compress their data to improve retrieval speed. Further, a network of slice servers can be used to implement numerous DDSNs, each having different characteristics, and using a subset or all of the available slice servers to store data.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 2 is a simplified network diagram of the operation of one aspect of the disclosed invention by which a plurality of dispersed data storage networks can be implemented from a set of slice servers;

DETAILED DESCRIPTION OF THE ILLUSTRATED EMBODIMENT

Figure 1:
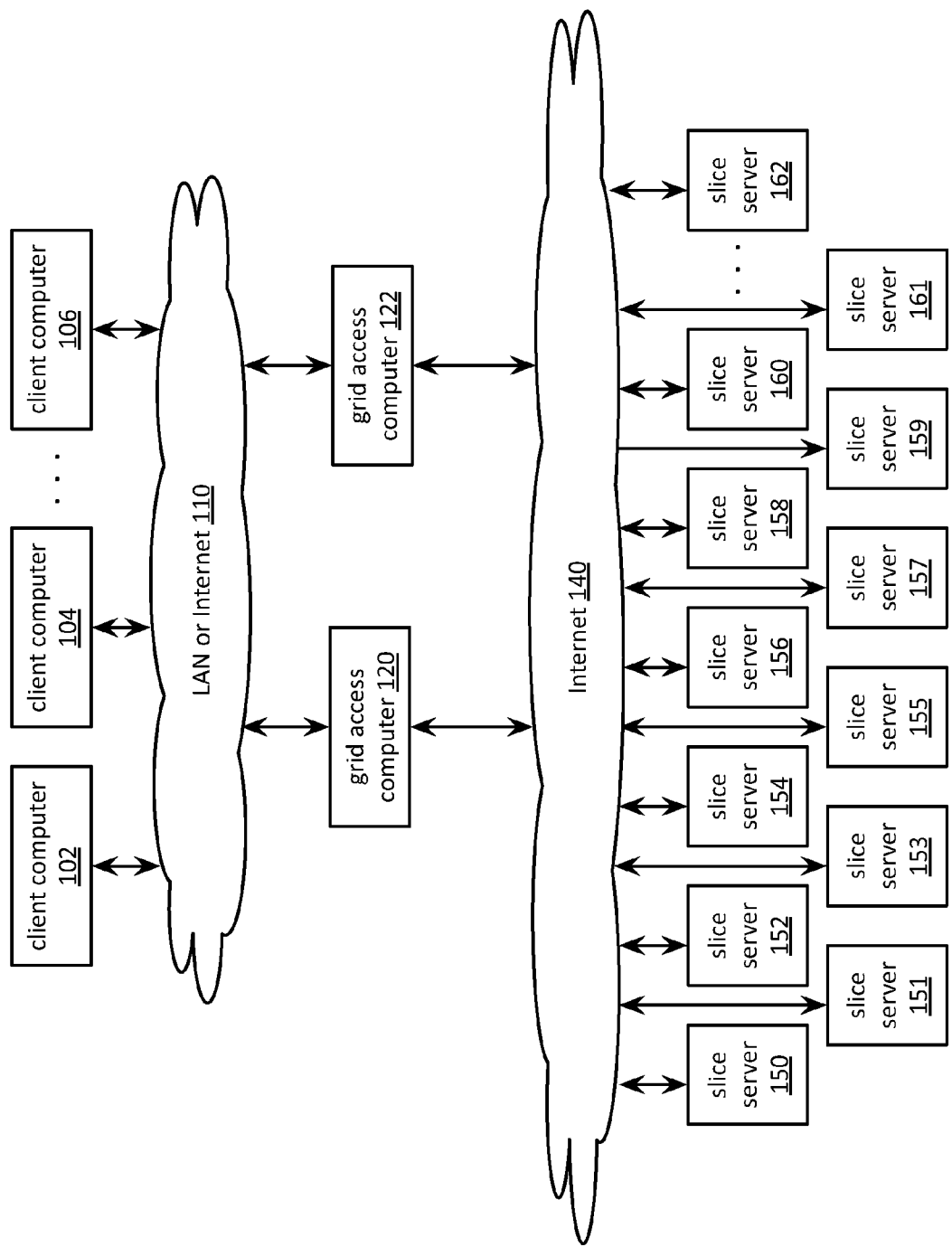
FIG. 1 is a network diagram of a dispersed data storage network constructed in accordance with an embodiment of the disclosed invention.

Turning to the Figures and to FIG. 1 in particular, a distributed computer system implementing a dispersed data storage grid 100 is shown. An arbitrary number of slice servers 150-162 store data slices sent to them by networked client computers 102,104,106. As illustrated, some number of grid access computers 120,122 allows access to the slice servers 150-162 by the client computers 102,104,106. Data segments are written to the grid by client computers 102,104,106. In accordance with an information dispersal algorithm, the data segments are sliced into multiple data slices that are then stored on slice servers 150-162.

As explained herein, the disclosed invention allows a network of slice servers to implement numerous dispersed data storage networks. In accordance with the disclosed invention, a subset of the available slice servers 150-162 is associated with a user account to form a dispersed data storage network. This information is stored in an accessible location, such as a grid access computer 120,122, on each client computer 102, 104,106, or elsewhere. This software construct, which is referred to herein as a "vault," allows for numerous DDSNs to be implemented from a network of slice servers. Each vault makes use of some number of slice servers, and a particular slice server may be associated with any number of vaults. There is no fixed relation between slice servers comprising a vault, except by the vault construct itself. By example, a first vault may be comprised of 16 slice servers. A second vault may utilize 4 slice servers in common with the first vault, and an additional 8 that are not used by the first vault.

In addition to storing information about what slice servers make up a particular DDSN, a vault will also store other information pertinent to the operation of a DDSN. This information includes what information dispersal algorithm ("IDA") is used on the DDSN, as well as the information required to operate the particular IDA, such as the number of slices that each data segment is divided into as well, which is also referred to as the quantity n, and the minimum number of data slices required to reconstruct a stored data segment, which is also referred to as the quantity m.

The vault also conglomerates other information that is relevant to the operation of a DDSN. The total storage that is available in a particular vault is stored, as well as the amount of storage that is presently occupied by data segments. In a fee-for-service system, this will prevent a particular user from using more storage than was paid for. In addition, a particular vault may require that data be encrypted, either before it is sliced, after it is sliced, or both before and after it is sliced. Accordingly, the vault structure can contain a field indicating that data segments and/or data slices are encrypted, as well as the particular algorithm that is used for encryption.

For certain applications, data stored on a DDSN may be compressed to increase the total amount of storage available. However, the use of compression can increase the time required to write and retrieve data. Accordingly, the vault can contain a field indicating if compression is to be used, and what type of compression should be used. In addition, while almost every DDSN makes use of integrity checks, certain applications may be better served by different types of integrity checks. For this purpose, the vault may contain a field allowing a user to specify a specific type of integrity check to be used for stored data segments as well as for stored data slices.

In addition to storing information about the particular DDSN associated with a vault, a vault may also include an access control list specifying which accounts are allowed to access the vault, and what permissions are associated with that account. For example, one user may have full access to a vault, while another user may only be allowed to read data segments from the vault, and not write data segments to, or modify data segments stored on the vault.

FIG. 2 explains the process of how access to a DDSN is handled through a vault. At step 1, a user logs into a particular account at a client computer 202. As part of the login process and at step 2, a grid access computer 212 assembles a vault definition, which may be resident on the grid access computer 212, stored on the slice servers 222, 224, 226 as distributed data, or stored elsewhere. The vault structure moderates access to a DDSN comprised of slice servers 222,224,226 by the client computer 202. At step 3, the client is connected through Internet to vault(s) residing on slices servers. At step 4, a slice server responds to client request.

Figure 3:
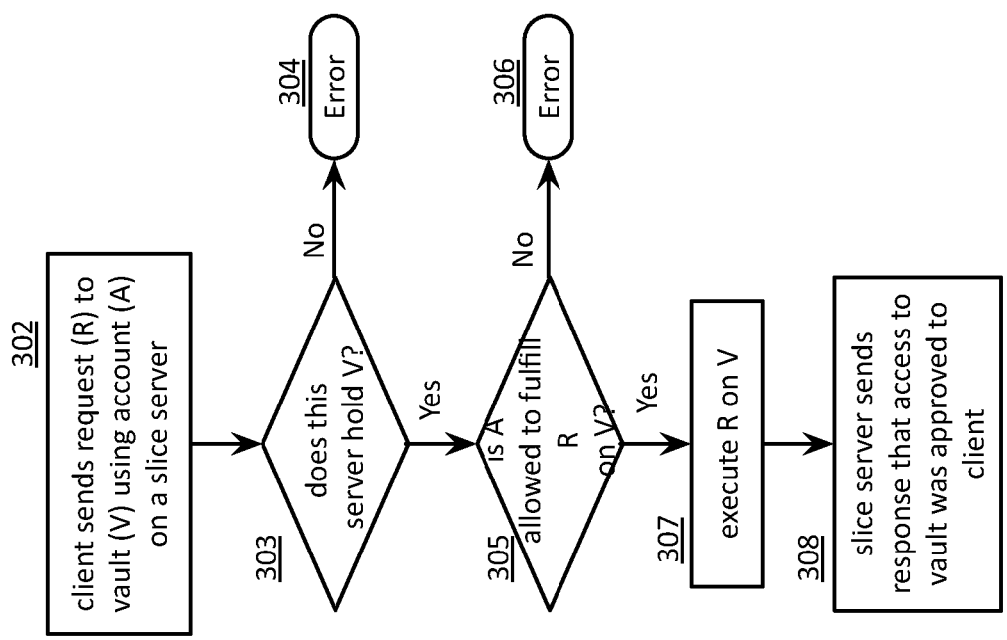
FIG. 3 is a flowchart illustrating the process by which a slice server authenticates requests received from various computers accessing a dispersed data storage network.

FIG. 3 illustrates the process by which a slice server authenticates a request from a client. After a client has logged into a vault, a client computer will originate one or more requests in step 302. Those requests will be directed to the appropriate slice server, and the slice server will validate that it can accept requests from the vault identified in the request in step 303. If the slice server cannot accept requests from the identified vault, an error is generated in step 304. The slice server also validates that the account identified in the request is allowed to make the specified request in step 305. If the slice server accepts requests from the identified vault and the identified account is allowed to make the specified request, the slice server will execute the request in step 307, and send a response back to the requesting client in step 308.

Figure 4:
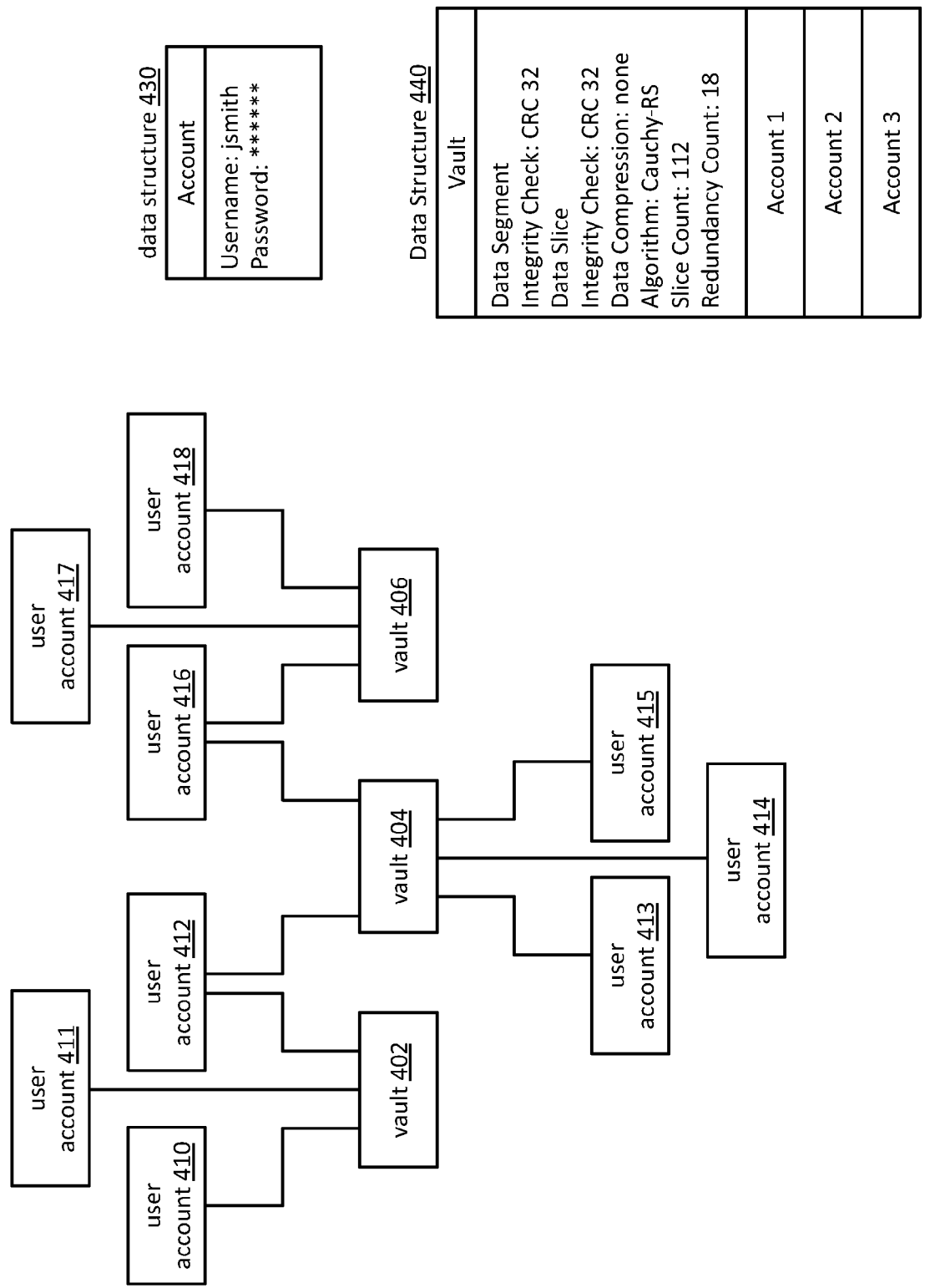
FIG. 4 is a data relationship diagram illustrating the relationship between user accounts and virtualized data storage vaults, as well as the structure of account and vault constructs.

FIG. 4 illustrates the relationship between user accounts and vaults. Three vaults 402,404,406 are depicted, as well as nine users 410-418. Users 410, 411, and 412 have access to vault 402. User 412 also has access to vault 2, and as indicated, there is a many to many relationship between vaults and user accounts. Data structure 440 illustrates one way that vault information could be maintained. In particular, the illustrated structure shows the information dispersal algorithm used on the DDSN associated with the vault, i.e., Cauchy-Reed Solomon. In addition, the information dispersal parameters are identified, i.e., data segments are divided into 112 data slices, of which any 18 may be lost without compromising the integrity of the stored data. Further, the vault data structure shows that no data compression is used, and that CRC-32 is used as an integrity check for both stored data segments and stored data slices. As illustrated, the data structure 440 does not indicate if stored data is encrypted, although alternative data structures could. Finally, data structure 440 lists three accounts that are allowed to access this particular vault. In addition to listing the associated accounts, the permissions granted to those accounts could also be listed here as well. As permissions are well-known in the art, they are not discussed further here.

FIG. 4 also shows data structure 430, which illustrates one way that a user account could be represented, namely by a username and a password. However, this particular representation of a user account is not a limitation of the invention; other methods well-known in the prior art would work just as well, for instance, biometric information.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A dispersed data storage system comprises:
a plurality of slice servers, wherein a first set of the plurality of slice servers supports a first virtual digital data storage vault and a second set of the plurality of slice servers supports a second virtual digital data storage vault, wherein a slice server of the plurality of slice servers is in the first set and is in the second set, and wherein the slice server functions to:
receive a request to access a virtual digital data storage vault;
determine whether the virtual digital data storage vault is the first or the second virtual digital data storage vault;
when the virtual digital data storage vault is the first or the second virtual digital data storage vault, determine whether the request is valid; and
when the request is valid, execute the request to generate a response.

2. The dispersed data storage system of claim 1, wherein each of the plurality of slice servers comprises:
a network port for coupling to a network, wherein the slice server receives the request via the network port and sends the response via network port.

3. The dispersed data storage system of claim 1, wherein the slice server further functions to determine whether the request is valid by:
accessing a first vault data structure when the request corresponds to accessing the first virtual digital data storage vault, wherein the first vault data structure includes first user account information; and
accessing a second vault data structure when the request corresponds to accessing the second virtual digital data storage vault, wherein the second vault data structure includes second user account information.

4. The dispersed data storage system of claim 1, wherein the slice server further functions to determine whether the request is valid by:
validating a user account identified in the request; and
when the user account is valid, validating the request based on permissions associated with the user account.

5. The dispersed data storage system of claim 1, wherein the slice server further functions to determine whether the virtual digital data storage vault is the first or the second virtual digital data storage vault by:
accessing a list of virtual digital data storage vaults supported by the dispersed data storage system; and
determining whether the first or the second virtual digital data storage vault is on the list.

6. The dispersed data storage system of claim 1, wherein the slice server further functions to:
generate an error when the request is not for accessing the first or the second virtual digital data storage vaults or when the request is invalid.

7. The dispersed data storage system of claim 1 further comprises:
each slice server of the first set of the plurality of slice servers stores:
a slice of a first data segment in a first section of a corresponding portion of
the first virtual digital data storage vault; and
a slice of a second data segment in a second section of the corresponding portion of the first virtual digital data storage vault; and
each slice server of the second set of the plurality of slice servers stores:
a slice of a third data segment in a first section of a corresponding portion of the second virtual digital data storage vault; and
a slice of a fourth data segment in a second section of the corresponding portion of the second virtual digital data storage vault.

8. A slice server comprises:
a network port operable for coupling to a network;
a central processing unit operably coupled to the network port; and
memory operably coupled to the central processing unit, wherein the central processing unit functions to:
maintain a list of virtual digital data storage vaults that are supported by the slice server, wherein the list of virtual digital data storage vaults is stored in the memory, wherein the list of virtual digital data storage vaults includes a plurality of entries, and wherein an entry of the plurality of entries includes a virtual digital data storage vault identifier and allocated memory space;
maintain an access control list that lists valid user accounts and corresponding permissions, wherein the access control list is stored in memory; and
process requests based on the list of virtual digital data storage vaults and the access control list.

9. The slice server of claim 8, wherein the central processing unit further functions to process requests by:
receiving the request via the network port;
identifying a virtual digital data storage vault from the request;
determining whether the identified virtual digital data storage vault is on the list of virtual digital data storage vaults;
when the identified virtual digital data storage vault is on the list of virtual digital data storage vaults, continuing processing the request based on the access control list; and
when the identified virtual digital data storage vault is not on the list of virtual digital data storage vaults, indicating an error.

10. The slice server of claim 8, wherein the central processing unit further functions to process requests by:
- when the request identifies a virtual digital data storage vault on the list of virtual digital data storage vaults, identifying a user account from the request;
- determining whether the user account is listed in the access control list;
- when the user account is not listed in the access control list, indicating an error;
- when the user account is listed in the access control list, identifying a function from the request;
- determining whether the function is within the permissions for the user account;
- when the function is not within the permissions for the user account, indicating the error; and
- when the function is within the permissions for the user account, executing the function to produce a response.

11. The slice server of claim 8, wherein the central processing unit further functions to:
- store a slice of a first data segment in a first section of a first virtual digital data storage vault;
- store a slice of a second data segment in a second section of the first virtual digital data storage vault;
- store a slice of a third data segment in a first section of a second virtual digital data storage vault; and
- store a slice of a fourth data segment in a second section of the second virtual digital data storage vault.

* * * * *

UNITED STATES PATENT AND TRADEMARK OFFICE
CERTIFICATE OF CORRECTION

| | |
|---|---|
| PATENT NO. | : 7,953,771 B2 |
| APPLICATION NO. | : 12/633779 |
| DATED | : May 31, 2011 |
| INVENTOR(S) | : S. Christopher Gladwin et al. |

Page 1 of 1

It is certified that error appears in the above-identified patent and that said Letters Patent is hereby corrected as shown below:

Title Page, Item (75): INVENTORS:

Replace "Ilya Volvolvski" with --Ilya Volvovski--

Signed and Sealed this
Twenty-eighth Day of February, 2012

David J. Kappos
*Director of the United States Patent and Trademark Office*